United States Patent
Itoh et al.

(10) Patent No.: US 7,130,731 B2
(45) Date of Patent: Oct. 31, 2006

(54) AUTOMATIC STOP/START CONTROLLER FOR ENGINE

(75) Inventors: Yoshiki Itoh, Shizuoka-ken (JP); Tatsuji Mori, Shizuoka-ken (JP); Norihiro Noda, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 10/761,178

(22) Filed: Jan. 20, 2004

(65) Prior Publication Data

US 2004/0153231 A1    Aug. 5, 2004

(30) Foreign Application Priority Data

Jan. 21, 2003    (JP)    ............................. 2003-012125

(51) Int. Cl.
F16H 59/14    (2006.01)
B60K 23/02    (2006.01)

(52) U.S. Cl. ............... 701/54; 123/179.4; 180/65.1
(58) Field of Classification Search ............... 701/54; 290/34, 38 E, 40 A; 123/179.4, 179.3; 477/116; 180/65.1
See application file for complete search history.

(56) References Cited

U.S. PATENT DOCUMENTS 5,316,116 A * 5/1994 Slicker et al. ............... 477/181
6,275,759 B1 * 8/2001 Nakajima et al. ............. 701/54
6,396,165 B1 * 5/2002 Nagano et al. ............ 307/10.6
6,463,375 B1 * 10/2002 Matsubara et al. ........... 701/54
6,482,125 B1 * 11/2002 Urasawa ..................... 477/107
6,492,741 B1 * 12/2002 Morimoto et al. ........ 290/40 C
6,730,000 B1 * 5/2004 Leising et al. .............. 477/110
6,776,739 B1 * 8/2004 Eguchi et al. .............. 477/107

FOREIGN PATENT DOCUMENTS

JP    9-331603    12/1997
JP    2002-106380    4/2002

* cited by examiner

Primary Examiner—Dalena Tran
(74) Attorney, Agent, or Firm—Flynn, Thiel, Boutell & Tanis, P.C.

(57) ABSTRACT

An automatic stop/start controller having an engine, a motor generator to drive the engine, and an automatic transmission. The automatic stop/start controller permits the engine to stop and start without operation of an ignition key. At start of the engine by not operation of the ignition key and after the engine is started to drive by the motor generator, a control means corrects to increase the torque generated by the motor generator according to the degree of the engagement of frictional engaging elements of the automatic transmission.

11 Claims, 5 Drawing Sheets

AUTOMATIC STOP/START CONTROLLER FOR ENGINE

CROSS REFERENCE TO RELATED APPLICATION

This application is related to the following applications: (1) Ser. No. 10/761,177 filed concurrently herewith, now U.S. Pat. No. 6,942,594, and titled "AUTOMATIC STOP/START CONTROLLER FOR AN ENGINE"; (2) Ser. No. 10/761,179 filed concurrently herewith, now U.S. Pat. No. 6,895,917, and titled "AUTOMATIC STOP/START CONTROLLER FOR ENGINE"; and (3) Ser. No. 10/761,176 filed concurrently herewith, and titled "AUTOMATIC STOP/START CONTROLLER FOR ENGINE", the entire disclosures of which are herein incorporated by reference.

FIELD OF THE INVENTION

This invention relates to an automatic stop/start controller for an engine, and more particularly to an automatic stop/start controller for a vehicle engine which prevents engine speed reduction due to proceeding with the degree of engagement of frictional engaging elements in an automatic transmission so as to achieve smooth increase in engine torque at automatic start of the engine without operation of an ignition key.

BACKGROUND OF THE INVENTION

Some vehicles are equipped with an automatic stop/start controller that automatically stops and starts an engine to improve fuel economy.

A conventional automatic stop/start controller includes an electrically powered oil pressure pump to generate oil pressure for frictional engaging elements that switch paths for transmitting driving force in the automatic transmission. The oil pressure pump operates to generate low oil pressure during engine stop without operation of an ignition key and to generate high oil pressure at start up of the engine without the operation of ignition key. Thereby the required oil pressure is maintained while saving the electric power consumed by the oil pump (see JP Laid-Open No. 2002-106380).

Another conventional automatic stop/start controller includes an engine, a stepped automatic transmission which achieves plural speeds by engagement or disengagement of frictional engaging elements, and a motor generator. From the beginning to finishing of changing speed of the automatic transmission, inertia torque is generated by variation of input rotational speeds which is accompanied by engagement or disengagement of the frictional engaging elements, and is transmitted from the automatic transmission to the driving wheels. The motor generator absorbs this inertial torque to control torque to reduce shock during changing speed (see JP Laid-Open No. H09-331603).

According to the conventional automatic stop/start controller, although the electric power consumption is restricted, the electrically powered oil pressure pump is operated and continuously consumes electric power while the engine is stopped without operation of the ignition key. It is desired to enhance fuel economy.

Elimination of the oil pressure in the automatic stop/start controller may increase the fuel economy by eliminating the electric power consumed by the oil pump. However this prevents maintaining of the oil pressure for the automatic transmission during the engine stop without operation of the ignition key. At engine start up without operation of the ignition key, there is a delay until the oil pressure is generated by a mechanical oil pressure pump driven by the engine and until the frictional engaging elements of the automatic transmission are engaged.

Also, if an accelerator pedal is depressed to drive the vehicle before the frictional engaging elements of the automatic transmission are engaged, the frictional engaging elements will be engaged after the engine speed has increased sharply. This results in shock and bad influence on durability of the automatic transmission.

The automatic stop/start controller to address these problems is equipped with an electric motor generator to drive the engine. The engine is firstly driven by the torque generated by the motor generator at start up of the engine without operation of the ignition key. Then the torque generated by the motor is gradually decreased after the engine is supplied with fuel and produces sufficient torque. Accordingly, the engine speed does not increase sharply even if the accelerator pedal is depressed before the frictional engaging elements of the automatic transmission are engaged. This is believed to suppress the shock in engaging and improves durability of the automatic transmission.

However, according to this latter automatic stop/start controller, the more the engagement of the frictional engaging elements of the automatic transmission proceeds, the more torque generated by the motor is expended to drive the vehicle. The engine speed decreases temporary to decrease the engine torque so that the driving force of the vehicle is undesirably temporarily decreased.

In addition, while the frictional engaging elements are engaging, the inertia torque is generated by reduction in the rotational speed of a turbine rotor wheel in a torque converter, and is added to an output shaft of the automatic transmission. After the driving force is enhanced, the inertia torque is lost when the frictional engaging elements finished engaging, so that the reduction in the driving force more remarkably appears. As a result, sufficient smooth transmission of the driving force may not be achieved.

SUMMARY OF THE INVENTION

In order to obviate or minimize the above-mentioned inconveniences, the present invention provides an automatic stop/start controller for a vehicle having an engine, a motor generator to drive the engine, and an automatic transmission. The automatic stop/start controller permits the engine to stop and start without operation of an ignition key. At start up of the engine without operation of the ignition key and after the engine is started to drive by the motor generator, the controller corrects to increase the torque generated by the motor generator according to the degree of engagement of frictional engaging elements of the automatic transmission.

According to the present invention, at start up of the engine without operation of the ignition key and after the engine is started to drive by the motor generator, the control means corrects to increase the torque generated by the motor generator according to the degree of engagement of frictional engaging elements of the automatic transmission. As a result, at start up of the engine without operation of the ignition key, the engine speed does not decrease, even the more torque generated by the motor generator is expended to drive the vehicle as the engagement of the frictional engaging elements proceeds. This achieves smooth increase in the engine torque and maintains smooth transmission of the driving force of the vehicle.

DETAILED DESCRIPTION

FIGS. 1–7 illustrate an embodiment of the present invention.

Figure 6:
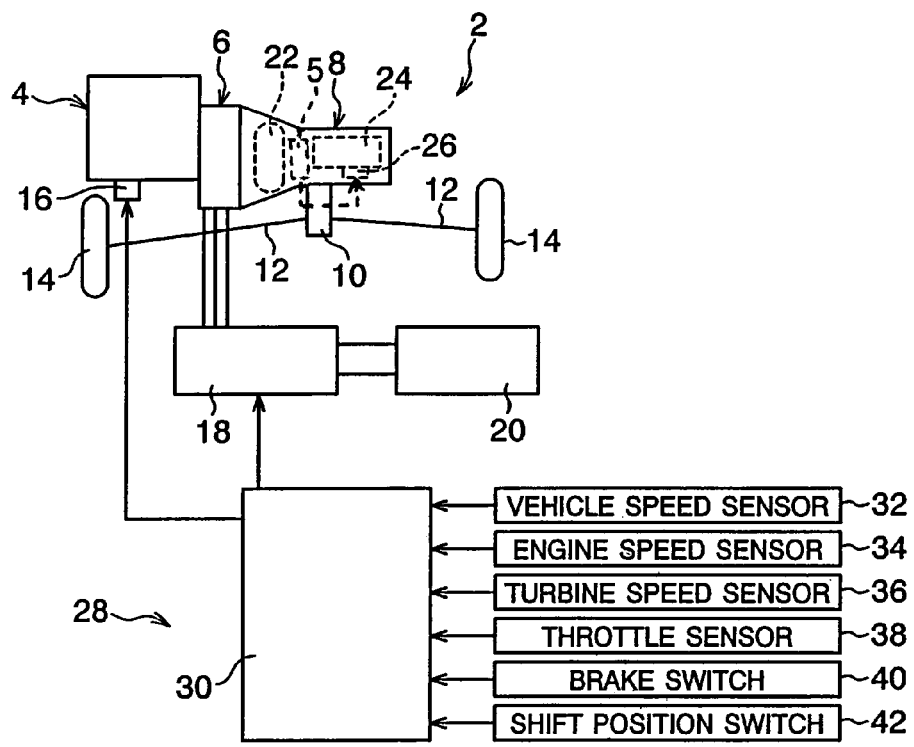
FIG. 6 is a schematic diagram showing the automatic stop/start controller.

FIG. 6 shows a vehicle 2, an internal combustion engine 4, an electric motor generator 6, and an automatic transmission 8. The vehicle 2 (i.e., a hybrid vehicle) is equipped with the engine 4, and the motor generator 6 to drive the engine 4 and the automatic transmission 8. In the vehicle 2, the driving force is generated by the engine 4 and/or the motor generator 6, and is transmitted from the automatic transmission 8 through a differential 10 and driving shafts 12 to driving wheels 14 to drive the vehicle 2.

The engine 4 is equipped with a fuel injection valve 16. The motor generator 6 is connected to the engine 4 and to a battery 20 through an inverter 18, and performs functions of assisting the engine 2 and power generating at least during the running of the vehicle 2. The motor generator 6 is driven by the electric power of the battery 20 to generate the torque to drive the engine 4, and is also driven by the driving force from the driving wheels 14 to generate electric power to charge the battery 20 through the inverter 18.

The automatic transmission 8 in connection with the motor generator 6 includes a torque converter 22 and a gearing section 24. The torque converter 22 is provided with a pump impeller, a turbine rotor wheel, and a stator (not shown). The torque is increased and transmitted from the pump impeller on an input side to the turbine rotor wheel on an output side. The gearing section 24 includes planet gears (not shown), and a frictional engaging element 26 of hydraulic pressure type formed by a clutch and a brake to switch paths for driving force transmission. The frictional engaging element 26 is engaged and disengaged by oil pressure generated by a mechanical oil pressure pump 5 driven by the driving force of the engine 4. Incidentally, this automatic transmission 8 is not equipped with an electrically powered oil pump for oil pressure generation.

The fuel injection valve 16 and the inverter 18 are connected to a control means 30 forming an automatic stop/start controller 28. The control means 30 includes a vehicle speed sensor 32 to detect the vehicle speed, an engine speed sensor 34 to detect the engine speed, a turbine rotational speed sensor 36 to detect the rotational speed of turbine rotor wheel in the torque converter 22, a throttle sensor 38 to detect opening degree of a throttle valve (not shown) of the engine 2, a brake switch 40 to detect a state in which a brake pedal (not shown) of the vehicle 2 is depressed, and a shift position switch 42 to detect a location of a shift lever (not shown) for the automatic transmission 8.

The control means 30 of the automatic stop/start controller 28 receives various signals output from the sensors 32, 34, 36, 38 and switches 40, 42. When an automatic stop condition is satisfied, then a fuel supply by the fuel injection valve 16 is prevented to stop the engine 4, which automatic stop condition includes, e.g., that the vehicle 2 is stopped while the engine 4 is operating. When an automatic start condition is satisfied, then the fuel supply by the fuel injection valve 16 begins so as to start the engine 4, which automatic start condition includes, e.g., that drive operation occurs when the engine 4 is stopped. Thereby, the engine 4 can be stopped and started without operation of an ignition key (not shown).

Incidentally, the automatic stop condition is set as a condition in which, e.g., the shift lever is in a drive range position and the brake pedal is depressed and the vehicle 2 is then stopped and the throttle valve is opened at an idle opening angle. Also the automatic start condition is set as a condition in which, e.g., the engine 4 is automatically stopped and the throttle valve is opened beyond the idle opening degree and the brake pedal is released.

Figure 7:
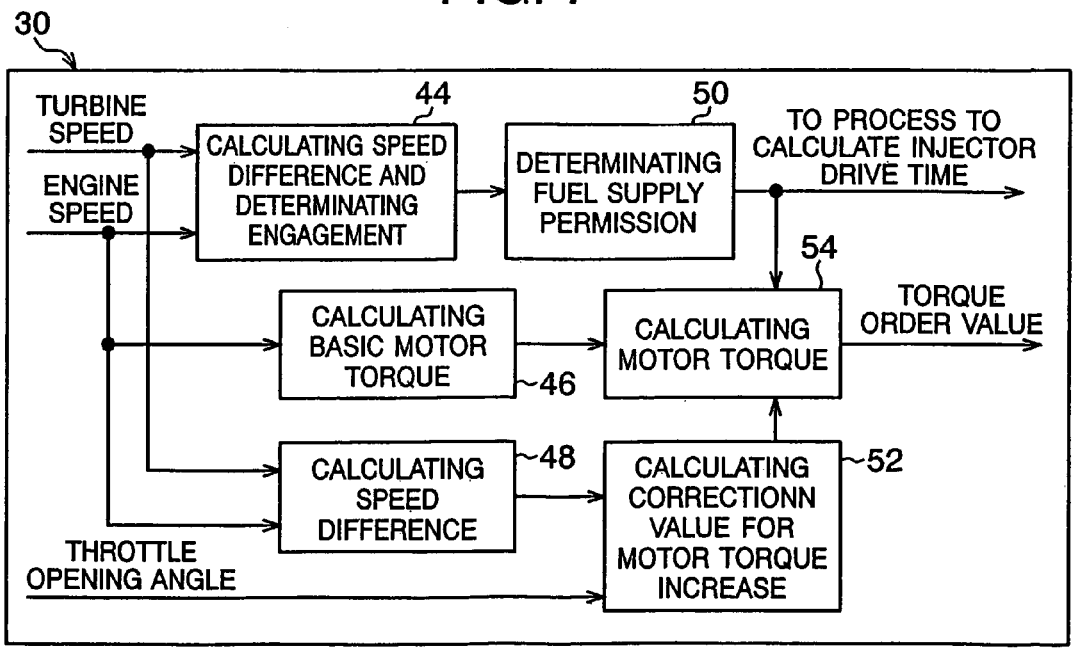
FIG. 7 is a schematic diagram showing control of the automatic stop/start controller.

As shown in FIG. 7, the control means 30 includes a calculating and determining section 44, a basic motor torque calculating section 46, a speed difference calculating section 48, a fuel supply permission determining section 50, a motor torque correction value calculation section 52, and a motor torque calculating section 54. More particularly, the calculating and determining section 44 calculates a rotational speed difference between input and output speeds of the torque converter 22 by comparison between the engine speed and the turbine speed, and determines the degree of the engagement of the frictional engaging element 26 based on the calculated speed difference. The basic motor torque calculating section 46 calculates the basis motor torque of the motor generator 6 according to the engine speed. The speed difference calculating section 48 calculates the speed difference between the engine speed and the turbine rotational speed. The fuel supply permission determining section 50 determines whether the fuel supply by the fuel injection valve 16 is permitted based on the signal output from the calculating and determining section 44, and sends a signal to an injector driving time calculating section (not shown). The motor torque correction value calculation section 52 calculates a "correction value for motor torque increase" generated by the motor generator 6 according to the output of the speed difference calculating section 48 along with the throttle opening degree. The motor torque calculating section 54 calculates the motor torque by the motor generator 6 according to the signals output from the sections 46, 50, 52, and outputs a torque order value to the inverter 18.

As a result, at start up of the engine without operation of the ignition key and after the engine is started by the motor generator 6 to drive so that the engine speed increases to be near to a target speed, the control means 30 of the automatic stop/start controller 28 corrects to increase the torque generated by the motor generator 6 according to the degree of engagement of the frictional engaging elements 26 of the automatic transmission 8.

The control means 30 controls so that the torque generated by the motor 6 is corrected according to the opening degree of the throttle valve of the engine 4. The degree of the engagement of the frictional engaging element 26 of the automatic transmission 8 is determined by a difference between the engine speed of the engine 4 and the turbine speed of the torque converter 22 of the automatic transmission 8. It is also determined whether the throttle opening degree of the throttle valve of the engine 4 is at least the idle opening degree or at the non-idle opening degree other than the idle opening degree. The torque generated by the motor 6 is corrected to be increased according to the state either at the idle opening or the non-idle opening degree.

The operation of the embodiment of the present invention is described as follows.

The control means 30 of the automatic stop/start controller 28 receives the signals from the sensors 32, 34, 36, 38 and switches 40, 42. The engine 4 is stopped when the automatic stop condition is satisfied while the engine 4 is operating, and the engine 4 is started when the automatic start condition is satisfied while the engine 4 is stopped. Thereby, the engine 4 can be stopped and started without operation of the ignition key (not shown).

Figure 1:
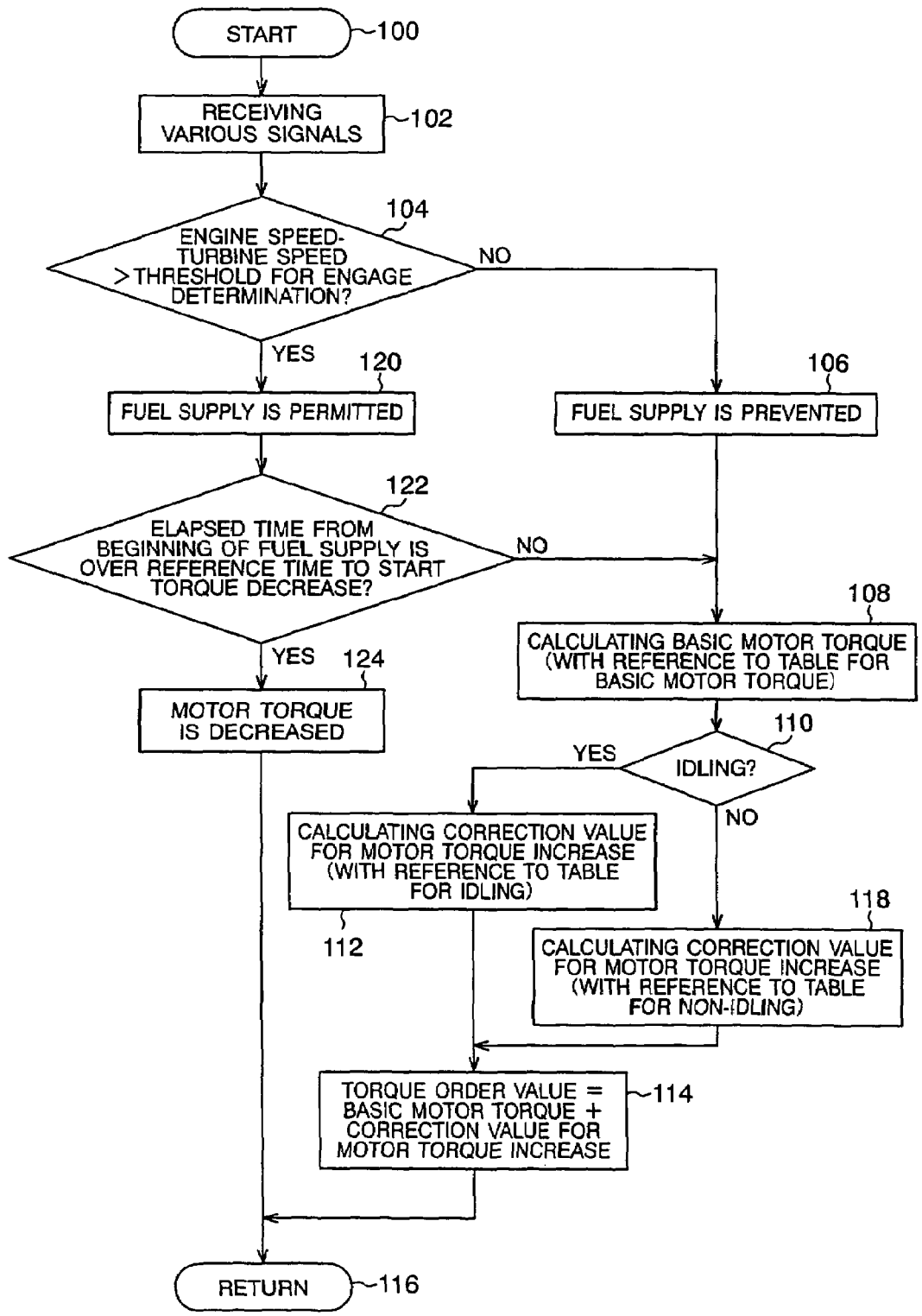
FIG. 1 is a flowchart for control of an automatic stop/start controller for an engine according to an embodiment of the present invention.
Figure 2:
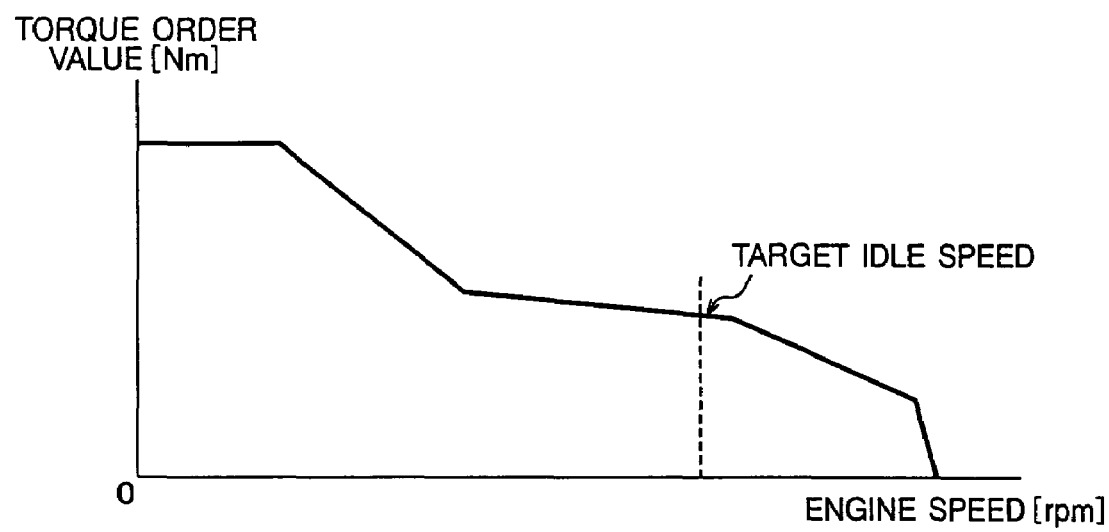
FIG. 2 is a table for calculating basic motor torque for a motor generator.

Referring to FIG. 1, at start up of the engine without operation of the ignition key, a program for the control means 30 of the automatic stop/start controller 28 starts at step 100. The control means 30 receives the various signals from the sensors 32, 34, 36, 38 and switches 40, 42 at step 102. Then a determination is made at step 104 whether the speed difference between the engine speed and the turbine speed exceeds a threshold for engage determination.

If the determination at step 104 is "NO", then the fuel supply by the fuel injection valve 16 to the engine 4 is prevented at step 106. Then the basic motor torque is calculated at step 108 according to the engine speed with reference to the table shown in FIG. 2 for calculating the basic motor torque. A determination is made at step 110 whether the throttle valve of the engine 4 is at an angle of the idle opening degree.

Figure 3:
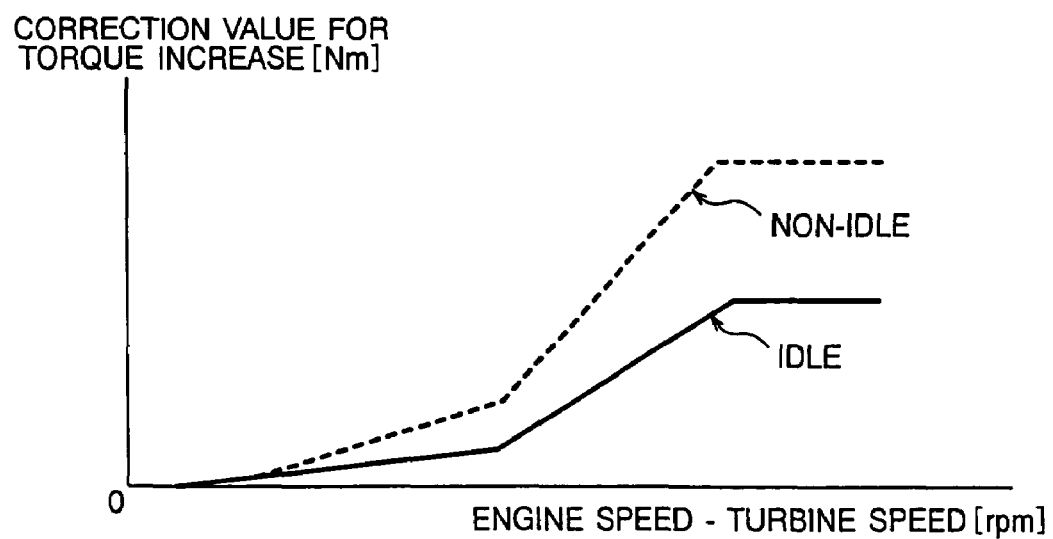
FIG. 3 is a table for calculating correction value for motor torque increase of the motor generator.
Figure 4:
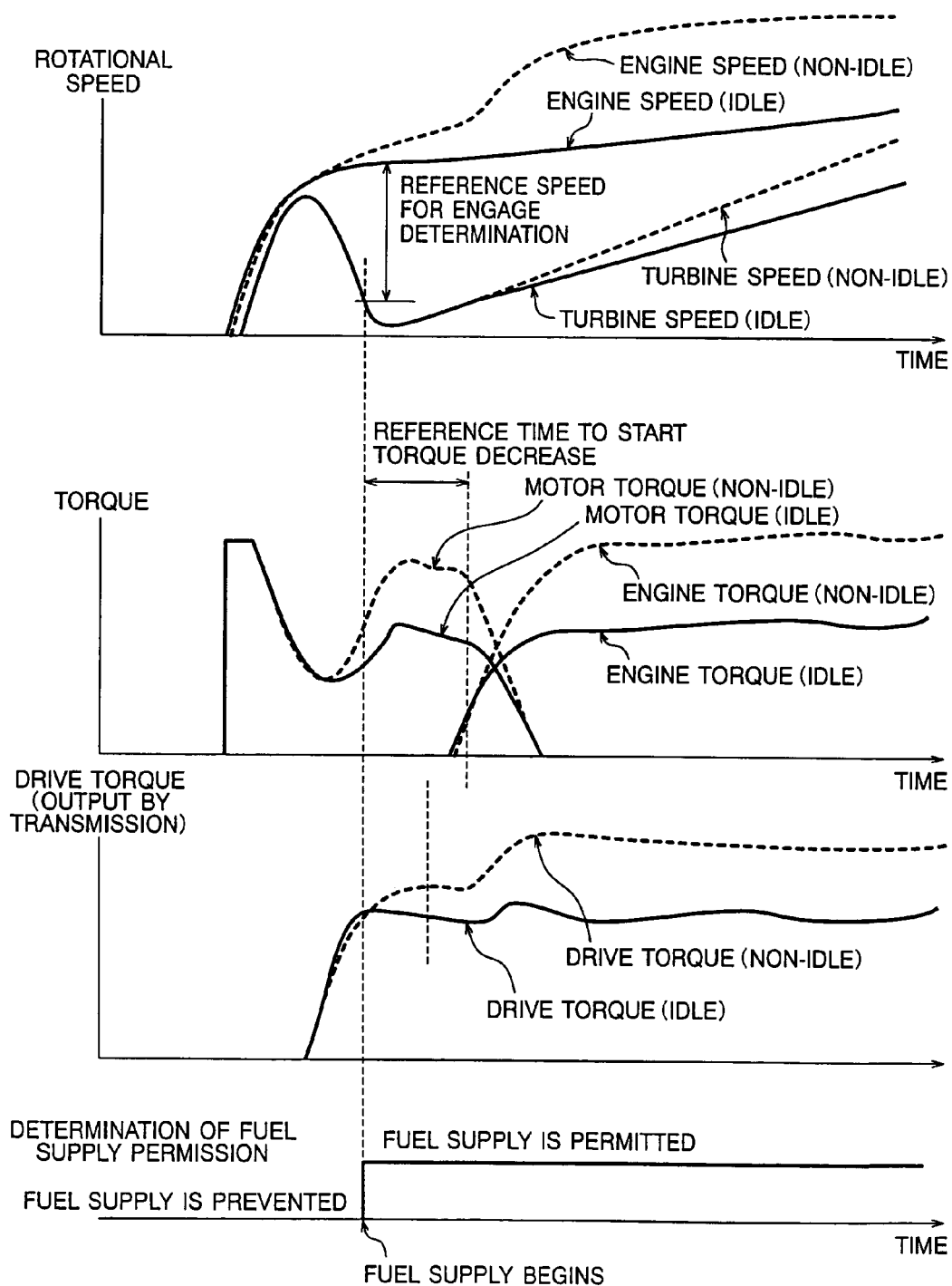
FIG. 4 is a time chart by control with the correction value for motor torque increase of the motor generator.

If the determination at step 110 is "YES", then the correction value to increase the motor torque for idle is calculated at step 112 according to the difference between the engine and turbine speeds with reference to the table for the correction value of motor torque increase for idle as indicated by solid line in FIG. 3. Also, the motor torque order value for idle is calculated at step 114 according to the basic motor torque and the correction value for motor torque increase for idle, and is output to the inverter 18 to drive the motor generator 6 as indicated by solid line in FIG. 4. The program returns at step 116.

If the determination at step 110 is "NO", then the correction value for motor torque increase for non-idle is calculated at step 118 according to the difference between the engine and turbine speeds with reference to the table for correction value for motor torque increase for non-idle that is set over the value for idle, as indicated by dashed line in FIG. 3. Also, the motor torque order value for non-idle is calculated at step 114 from the basic motor torque and the correction value for the motor torque increase, and is output to the inverter 18 to drive the motor generator 6 as indicated by dashed line in FIG. 4. The program returns at step 116.

If the determination at step 104, i.e., whether the difference between the engine speed and the turbine speed exceeds the threshold for engage determination, is "YES", then the fuel supply by the fuel injection valve 16 to the engine 4 is permitted at step 120. Then a determination is made at step 122 whether the elapsed time from the beginning of the fuel supply of the fuel injection valve 16 exceeds a "reference time to start torque decrease" that corresponds to time from the beginning of the fuel supply until the engine 4 can output torque.

If the determination at step 122 is "NO", then the program goes to the step 108. If the determination at step 122 is "YES", then the motor torque is decreased at step 124 and the program returns at step 116.

As thus described, the automatic stop/start controller 28 for the engine 4 is not equipped with an electrically powered oil pressure pump to generate the oil pressure for the automatic transmission 8. At start up of the engine without the operation of the ignition key and after the engine is started by the motor generator 6 to drive so that the engine speed increases so as to be near to the target speed, the speed difference is calculated by comparison between the engine speed and the turbine speed so as to determine the degree of engagement of the frictional engaging element of the automatic transmission 6. According to the determined degree of engagement of the frictional engaging element, the controller corrects and increases the torque generated by the motor generator 6.

Thereby, at start of the engine without operation of the ignition key, the automatic stop/start controller 28 prevents the engine speed reduction as seen in the conventional device, even the more torque generated by the motor generator 6 is expended to drive the vehicle as the engagement of the frictional engaging elements progress. This automatic stop/start controller 28 achieves a smooth increase in the engine torque, and maintains smooth transmission of the driving force of the vehicle.

In addition, according to the automatic stop/start controller 28 of the present invention, the torque generated by the motor 6 is based on not only the engaging degree of the frictional engaging element 26 but also the opening degree of the throttle valve, and is corrected to be increased in accordance with the state of either the idle opening degree or the non-idle opening degree in this embodiment. That is, the precise control can be executed according to the throttle opening degree.

For example, the correction value can be of greater value to increase the engine speed when the throttle valve is opened, so that the engine torque is increased smoothly even if the engine 4 is supplied with the fuel and is about to generate torque.

Further, the automatic stop/start controller 28 determines the degree of engagement of the frictional engaging element 26 of the automatic transmission 8 by the speed difference between the engine speed of the engine 4 and the turbine speed of the torque converter 22 of the automatic transmission 8. These speeds are detected by the existing engine speed sensor 34 and turbine speed sensor 36, which eliminates the additional dedicated sensor and reduces the number of parts.

In addition, in this automatic stop/start controller 28 at start up of the engine without the operation of the ignition key, the engine 4 is started by the torque of the motor generator 6 so that the engine speed increases to be near to the target speed. The speed difference is calculated by comparison between the engine speed and the turbine speed. By this calculated value, if it is determined that the frictional engaging element of the automatic transmission 6 is engaged, the fuel supply to the engine is started. The torque by the motor 6 is decreased after the reference time to determine the torque decrease that corresponds to time from the beginning of the fuel supply until the engine 4 can output torque. Accordingly, the engine speed is not reduced temporary as indicated by dashed line in FIG. 5, even if the accelerator pedal is depressed before the frictional engaging element of the automatic transmission is engaged. Also, reduction of the driving force by the inertia torque does not remarkably appear. The engine speed increases smoothly as indicated by solid line in FIG. 5, so that the shock at engaging is prevented and the durability of the automatic transmission is improved.

In this embodiment, the torque generated by the motor 6 is corrected and increased according to the degree of the engagement of the frictional engaging element 26. It is noted that the torque can be corrected and increased according to the temperature of the operated oil pressure of the frictional engaging element 26 so that the engine torque is smoothly increased at low temperature and the smooth transmission of the driving force of the vehicle is maintained.

Figure 5:
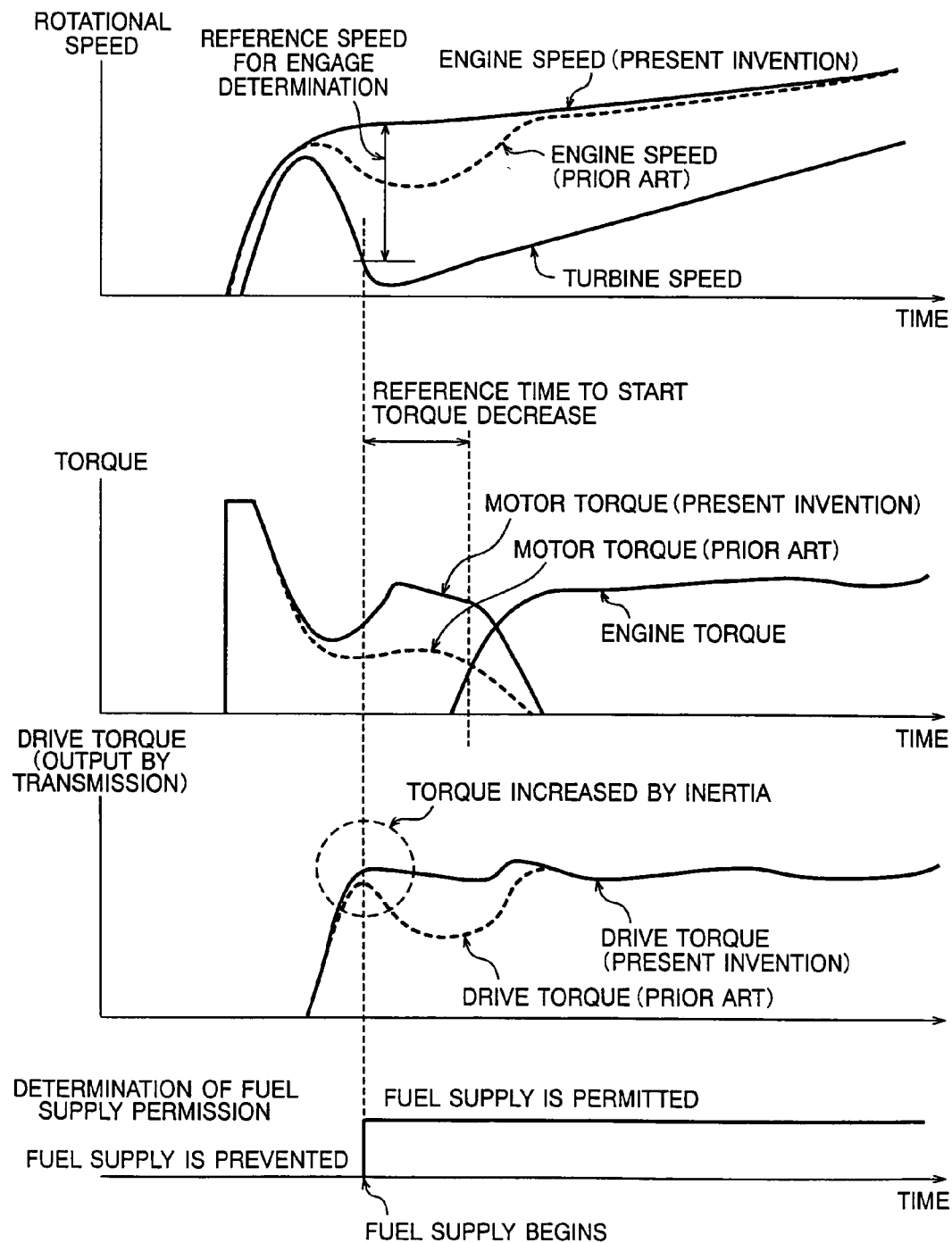
FIG. 5 is a time chart by control with the motor torque decrease of the motor generator.

Also in this embodiment, the degree of the engagement of the frictional engaging element 26 of the automatic transmission 8 is determined by the difference between the engine speed of the engine 4 and the turbine speed of the torque converter 22 of the automatic transmission 8. However, as shown in FIG. 5, the turbine speed, which is increased by the drive of the engine 4 at the beginning, decreases as the degree of engagement of the frictional engaging element 26 proceeds. Accordingly, the degree of engagement of the frictional engaging element 26 can also be determined from the degree of first decrease in the turbine speed after the engine 4 is started. That is, the degree of the engagement may also be determined from the turbine speed only, which simplifies the determination.

As thus described, at start up of the engine without operation of the ignition key, the automatic stop/start controller prevents reduction in engine speed, even the more torque generated by the motor generator is expended to drive the vehicle as the engagement of the frictional engaging elements is progressed. This achieves smooth increase in the engine torque and maintains smooth transmission of driving force of the vehicle.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automatic stop/start controller for a vehicle having an engine, a motor generator to drive the engine, an automatic transmission which includes frictional drive engaging elements, and an oil pressure pump which generates oil pressure to engage and disengage said frictional drive engaging elements, said automatic stop/start controller permitting the engine to stop and start without operation of an ignition key, wherein, at start of the engine without operation of the ignition key and after said engine is started to drive by said motor generator of which the amount of torque is variably set based on a determination as to whether the throttle opening angle is at an idle opening angle, the controller corrects to increase the torque generated by said motor generator according to the degree of engagement of said frictional drive engaging elements of said automatic transmission, and starts the fuel supply to the engine when the degree of engagement of the frictional drive engaging elements exceeds a predetermined threshold, the frictional engaging elements being driven by said oil pressure generated by the oil pressure pump, wherein the oil pressure pump comprises a mechanical pump that is driven by a driving force of the engine.

2. The automatic stop/start controller for the engine as defined in claim 1, wherein said controller corrects and increases the torque generated by said motor generator according to opening degree of a throttle valve of said engine.

3. The automatic stop/start controller for the engine as defined in claim 2, wherein said controller determines the degree of engagement of said frictional engaging elements of said automatic transmission by comparison between the engine speed of said engine and the turbine rotational speed of a torque converter of said automatic transmission.

4. The automatic stop/start controller for the engine as defined in claim 2, wherein said motor generator performs functions of assisting said engine and of power generating at least during running of said vehicle.

5. The automatic stop/start controller for the engine as defined in claim 1, wherein said controller determines the degree of engagement of said frictional engaging elements of said automatic transmission by comparison between the engine speed of said engine and the turbine rotational speed of a torque converter of said automatic transmission.

6. The automatic stop/start controller for the engine as defined in claim 1, wherein said motor generator performs functions of assisting said engine and of power generating at least during running of said vehicle.

7. A hybrid vehicle, comprising:
an internal combustion engine;
an electric motor-generator drivingly connected to the engine to assist in driving of said engine when functioning as a motor;
an automatic change-speed transmission drivingly connecting said engine and said motor to said vehicle wheels, said transmission having a rotational turbine associated therewith and also having frictional engaging drive elements;
an oil pressure pump that is a mechanical pump mechanically driven by a driving force of the engine, said oil pressure pump generating oil pressure to engage and disengage said frictional drive engaging elements; and
an automatic stop/start controller for permitting starting and stopping of the engine without operation of an ignition key;
the amount of torque generated by said motor being variably set based on a determination as to whether the throttle opening angle is at an idle opening angle, said controller increasing the torque generated by said motor for supply to said transmission according to the degree of engagement of the frictional engaging drive elements of said automatic transmission, and starts the fuel supply to the engine when the degree of engagement of the frictional engaging drive elements exceeds a predetermined threshold.

8. A vehicle according to claim 7, wherein the controller determines the degree of engagement of said frictional engaging elements of said automatic transmission by comparison between the engine speed of said engine and the turbine rotational speed of a torque converter of said automatic transmission.

9. A vehicle according to claim 7, wherein the controller corrects and increases the torque generated by said motor generator according to opening degree of a throttle valve of said engine.

10. A process for controlling the startup of an internal combustion engine having a motor generator coupled thereto for assisting in driving said engine, and an automatic transmission drivingly coupled to the output of said engine and said motor, the transmission having a rotatable turbine wheel and having frictional drive engaging elements, and a controller for controlling said motor to permit starting and stopping of said engine without use of an ignition key, comprising the steps of:
energizing the motor to effect starting of said engine without use of an ignition key;
determining if the engine speed exceeds the transmission turbine speed by a predetermined reference amount;

when the engine speed exceeds the turbine speed by less than said predetermined differential, preventing the supply of fuel to the engine;

then determining a motor torque value according to engine speed with reference to a motor torque table;

then increasing the motor torque value according to either the idle or non-idle opening degree of the engine throttle; and then increasing the torque output of the motor in accordance with the increased motor torque value.

11. An automatic stop/start controller for a vehicle comprising an engine having a throttle which operates based on a throttle opening angle, a motor generator to drive the engine, an automatic transmission which includes frictional drive engaging elements which are engagable and disengagable to transmit torque from the engine and the motor generator to wheels of the vehicle, and an oil pressure pump which is a mechanical pump that is driven by a driving force of the engine to generate oil pressure, the frictional engaging elements being driven by said oil pressure generated by the oil pressure pump which said oil pressure serves to thereby engage and disengage said frictional drive engaging elements, the degree of engagement of the frictional engaging elements being variable depending upon variations in said oil pressure during starting and stopping of said engine, said automatic stop/start controller permitting the engine to stop and start without operation of an ignition key, wherein, at start of the engine without operation of the ignition key and after said engine is started to drive by said motor generator, the amount of torque is variably set by the controller based on a determination as to whether the throttle opening angle is at an idle opening angle, and wherein the controller corrects to increase the torque generated by said motor generator according to the degree of engagement of said frictional drive engaging elements of said automatic transmission which progressively reengage as the engine is started, and the controller starts the fuel supply to the engine when the degree of engagement of the frictional drive engaging elements exceeds a predetermined threshold.

* * * * *